United States Patent
Park et al.

(10) Patent No.: US 7,861,257 B2
(45) Date of Patent: Dec. 28, 2010

(54) METHOD AND APPARATUS FOR DISPLAYING VIEWING TIME AND TV RATINGS BASED ON VIEWER GRADE

(75) Inventors: Sang-hyun Park, Seoul (KR); Young-kyu Jin, Seoul (KR); Seung-eok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 595 days.

(21) Appl. No.: 11/492,806

(22) Filed: Jul. 26, 2006

(65) Prior Publication Data

US 2007/0033611 A1    Feb. 8, 2007

(30) Foreign Application Priority Data

Aug. 4, 2005    (KR) .................. 10-2005-0071436

(51) Int. Cl.
    *H04N 7/16*    (2006.01)
(52) U.S. Cl. ..................... 725/28; 725/29; 725/27; 348/836
(58) Field of Classification Search ............ 725/28, 725/29, 9; 348/815.4, 836
    See application file for complete search history.

(56) References Cited

U.S. PATENT DOCUMENTS

| | | | |
|---|---|---|---|
| 6,505,348 B1 | 1/2003 | Knowles et al. | |
| 6,778,226 B1* | 8/2004 | Eshelman et al. | ............ 348/836 |
| 6,922,843 B1* | 7/2005 | Herrington et al. | ............ 725/30 |
| 7,140,033 B1* | 11/2006 | Durden et al. | ................ 725/80 |
| 7,616,262 B2* | 11/2009 | Eves et al. | .................. 348/553 |
| 2002/0036637 A1* | 3/2002 | Ogawa | .................. 345/212 |
| 2003/0121058 A1 | 6/2003 | Dimitrova et al. | |
| 2003/0127705 A1 | 7/2003 | Kwak et al. | |
| 2004/0025175 A1* | 2/2004 | Tamekuni et al. | ................ 725/9 |
| 2006/0203136 A1* | 9/2006 | Testin et al. | .................. 348/836 |
| 2007/0081101 A1* | 4/2007 | Diederiks et al. | ............ 348/602 |

FOREIGN PATENT DOCUMENTS

| | | |
|---|---|---|
| CN | 1437406 A | 8/2003 |
| JP | 2000175117 A | 6/2000 |
| JP | 2001-275051 A | 10/2001 |
| JP | 2001-333343 A | 11/2001 |

(Continued)

OTHER PUBLICATIONS

Translation for Ran-Kwon Kim. KR 2000-0004275. "Automatic Viewing Time Display Mehod for Television".*

(Continued)

*Primary Examiner*—Andrew Y Koenig
*Assistant Examiner*—Junior O Mendoza
(74) *Attorney, Agent, or Firm*—Sughrue Mion, PLLC

(57) ABSTRACT

A method and an apparatus for displaying the viewing time and TV ratings based on a viewer grade, wherein information on the TV ratings and viewing time is indicated using lamps provided in the external case of the display apparatus. The display apparatus includes an information-analysis unit that analyzes the viewer grade based on user information inputted by a user of the display apparatus and TV ratings by extracting program information from signals broadcasted by a broadcasting station, a ratings-comparison unit that compares the viewer grade with the TV ratings, and a lamp-control unit that lights lamps according to the comparison result.

7 Claims, 10 Drawing Sheets

(12)

| Program Rating \ Age Rating | 3 to 5 | 6 to 11 | 12 to 14 | 15 to 18 | Over 19 |
|---|---|---|---|---|---|
| Over 3 | blue | blue | blue | blue | blue |
| Over 12 | blue+blue+red | blue+blue+red | blue | blue | blue |
| Over 15 | blue+red+red | blue+red+red | blue+red | blue | blue |
| Over 19 | red | red | red | red | blue |

(11)

FOREIGN PATENT DOCUMENTS

| | | | |
|---|---|---|---|
| JP | 2003-051992 A | | 2/2003 |
| JP | 2003-517766 A | | 5/2003 |
| JP | 2005-514818 A | | 8/2005 |
| KR | 19940025708 | | 11/1994 |
| KR | 10-1995-0004963 A | | 2/1995 |
| KR | 10-1995-0022817 A | | 7/1995 |
| KR | 1019970009241 A | | 2/1997 |
| KR | 102000004275 | * | 1/2000 |
| KR | 20-0292588 Y1 | | 10/2002 |
| KR | 20020022631 | * | 10/2002 |
| KR | 1020040036178 A | | 4/2004 |
| KR | 1020050023513 | * | 3/2005 |
| KR | 1020050023513 A | | 3/2005 |
| WO | 9821891 | | 5/1998 |
| WO | 9931881 | | 6/1999 |

OTHER PUBLICATIONS

Alpert, T., et al., "Subjective evaluation of MPEG-4 video codec proposals: Methodological approach and test procedures," Signal Processing: Image Communication 9 (1997) 305-325.

Yadavalli, G., et al., "Frame Rate Preferences in Low Bit Rate Video," Proceeding 2003 Intn'l Conf. on Image Processing, Barelona, Spain, and Intn'l Conf. on Image Processing N.Y., N.Y. Sep. 14-17, 2003, pp. 441-444.

Ledda, P., et al., "HDR displays: a validation against reality," Systems Man and Cybernetics, 2004 IEEE Intn'l Conf. on the Hague, and Piscataway, N.J. Oct. 10-13, 2004, pp. 2777-2783.

Communication dated Nov. 4, 2009 issued by Japanese Patent Office in Counterpart Japanese Application No. 2006-212317.

* cited by examiner

FIG. 2A

| Age Rating / Program Rating | 3 to 5 | 6 to 11 | 12 to 14 | 15 to 18 | Over 19 |
|---|---|---|---|---|---|
| Over 3 | blue | blue | blue | blue | blue |
| Over 12 | blue+blue+red | blue+blue+red | blue | blue | blue |
| Over 15 | blue+red+red | blue+red+red | blue+red | blue | blue |
| Over 19 | red | red | red | red | blue |

FIG. 2B

| Operating time of display device | Lamp brightness |
|---|---|
| Less than 4 hours | 1St lighting stage (low brightness) |
| Less than 8 hours | 2St lighting stage (moderate brightness) |
| More than 8 hours | 3St lighting stage (maximum brightness) |

(21) (22)

—— blue
---- red

—— blue          ▨ blue
---- red

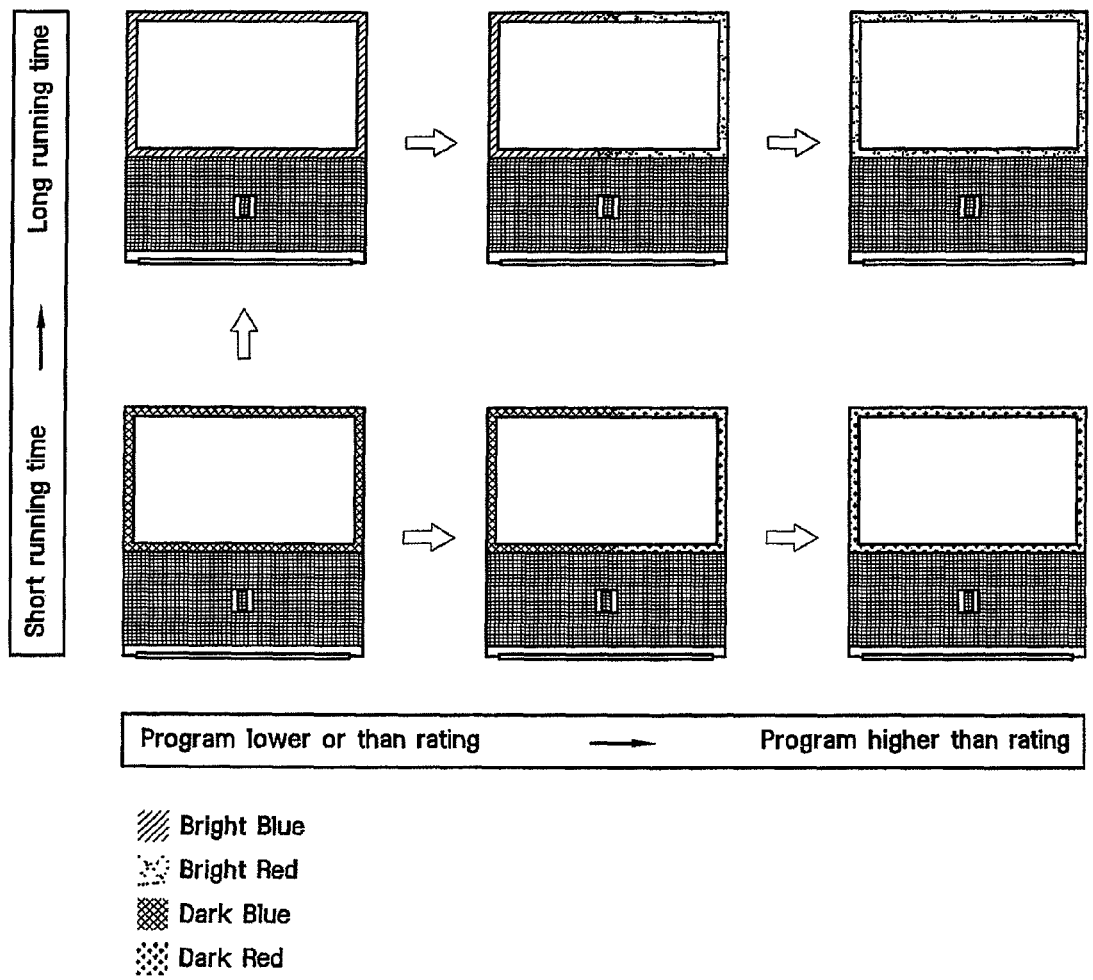

METHOD AND APPARATUS FOR DISPLAYING VIEWING TIME AND TV RATINGS BASED ON VIEWER GRADE

CROSS-REFERENCE TO RELATED APPLICATION

This application is based on and claims priority from Korean Patent Application No. 10-2005-0071436 filed on Aug. 4, 2005 in the Korean Intellectual Property Office, the disclosure of which is incorporated herein in its entirety by reference.

BACKGROUND OF THE INVENTION

1. Field of the Invention

The present invention relates to a method and an apparatus for displaying the viewing time and TV ratings based on a viewer grade and, more particularly, to a display method and a display apparatus for displaying the viewing time and TV ratings based on a viewer grade, whereby information on TV ratings and viewing time is indicated by using lamps provided in the external case of the display apparatus.

2. Description of the Related Art

TV programs may include violence and sexuality, which are harmful to children. Accordingly, various parental control systems to block unsuitable programs or channels have been developed.

A blocking system using the V-chip or violence-chip, which blocks TV programs having nudity and violence, has been used in the United States in order to inform viewers of ratings of TV programs. The ratings are encoded by a broadcaster using a data format called the extended data service (XDS) and the vertical blanking period of a National Television Standards Committee (NTSC) TV signal, more particularly, line 21 of the second field of the TV signal. The XDS data format is similar to the closed-captioning format used in the United States, which is encoded on line 21 of the first field of the NTSC TV signal. The XDS and closed-captioning formats are standards (EIA-608) developed by the U.S. Consumer Electronics Association (CEA). A ratings signal is transmitted along with each TV program and is read by the V-chip system built in each TV set manufactured after January 2000. The V-chip system decodes the data on line 21, compares the decoded data with its permitted ratings, and decides whether to block or release the signal.

However, many children's daily lives involve a lot of TV and older children may defy their parents by manipulating the V-chip system when a TV program is forcefully blocked, a channel is changed, or an image is distorted.

As an alternative, a display, which shows a person's TV viewing history, may be shown in the application form. However, this method requires a user navigating several GUI (Graphical User Interface) steps, which is inconvenient.

Text information has several problems: it takes a long time to read it, it is difficult to read at a glance, only a viewer of the concerned TV program can recognize it, and it is not possible to continuously display it. Further, the problem associated with the viewing time is still insoluble.

Accordingly, there is a demand for a method to more naturally guide children's TV-watching. A method that allows parents to quickly grasp the TV-watching history of their child is also required.

Korean Unexamined Patent Publication No. 1997-56839 entitled "TV Set Equipped with an Illuminating System" discloses a TV set with a built-in lighting device, whereby the lighting device stays lit for a certain period of time after the TV is turned off while a user has been watching the TV in the dark. The lighting device is activated depending upon the measured ambient brightness. However, this invention does not provide the technology to provide information on the viewing time and ratings of the TV programs watched by the user, based on a viewer grade, by changing the color of the lighting device.

SUMMARY OF THE INVENTION

The present invention provides information on viewing time and ratings of a TV program watched by a viewer, based on a viewer grade, by using a plurality of lamps provided in the external case of a display apparatus.

The present invention further provides convenience to a user in observing the TV watching history and ratings of the program that is watched by the user, using a display apparatus (i.e., a TV set).

The present invention will not be limited to the technical objects described above. Other aspects not described herein will be more definitely understood by those in the art from the following detailed description.

According to an aspect of the present invention, there is provided an apparatus for displaying viewing time and program ranking based on the viewer grade of a viewer, according to an exemplary embodiment of the present invention, which includes an information analysis unit that analyzes a viewer grade based on information regarding the user inputted by the user using an equipped display apparatus and analyzes TV ratings by gathering program information from broadcasting signals transmitted from a broadcasting station, a ratings comparison unit that compares TV ratings with a viewer grade and a lamp control unit that lights lamps of different colors according to the result of the comparison.

According to another aspect of the present invention, there is provided a method for displaying viewing time and TV ratings based on a viewer grade, according to an exemplary embodiment of the present invention, which includes inputting information on a user by the user himself who uses the display apparatus, analyzing viewer grade based on the inputted user's information, analyzing TV ratings by extracting program information from broadcasting signals transmitted from a broadcasting station, comparing TV ratings with the determined viewer grade, and lighting a specific colored lamp according to the result of the comparison.

BRIEF DESCRIPTION OF THE DRAWINGS

The above and other aspects and features of the present invention will become more apparent by describing in detail exemplary embodiments thereof with reference to the accompanying drawings in which:

FIGS. 2A and 2B are a set of tables showing information on TV ratings and the brightnesses of lamps according to the viewing time stored in a storage unit of the display apparatus, according to an exemplary embodiment of the present invention;

FIG. 4 is a diagram illustrating the colors of lamps that are lit based on TV ratings and the viewing time according to an exemplary embodiment of the present invention;

DETAILED DESCRIPTION OF EXEMPLARY EMBODIMENTS

Figure 1:
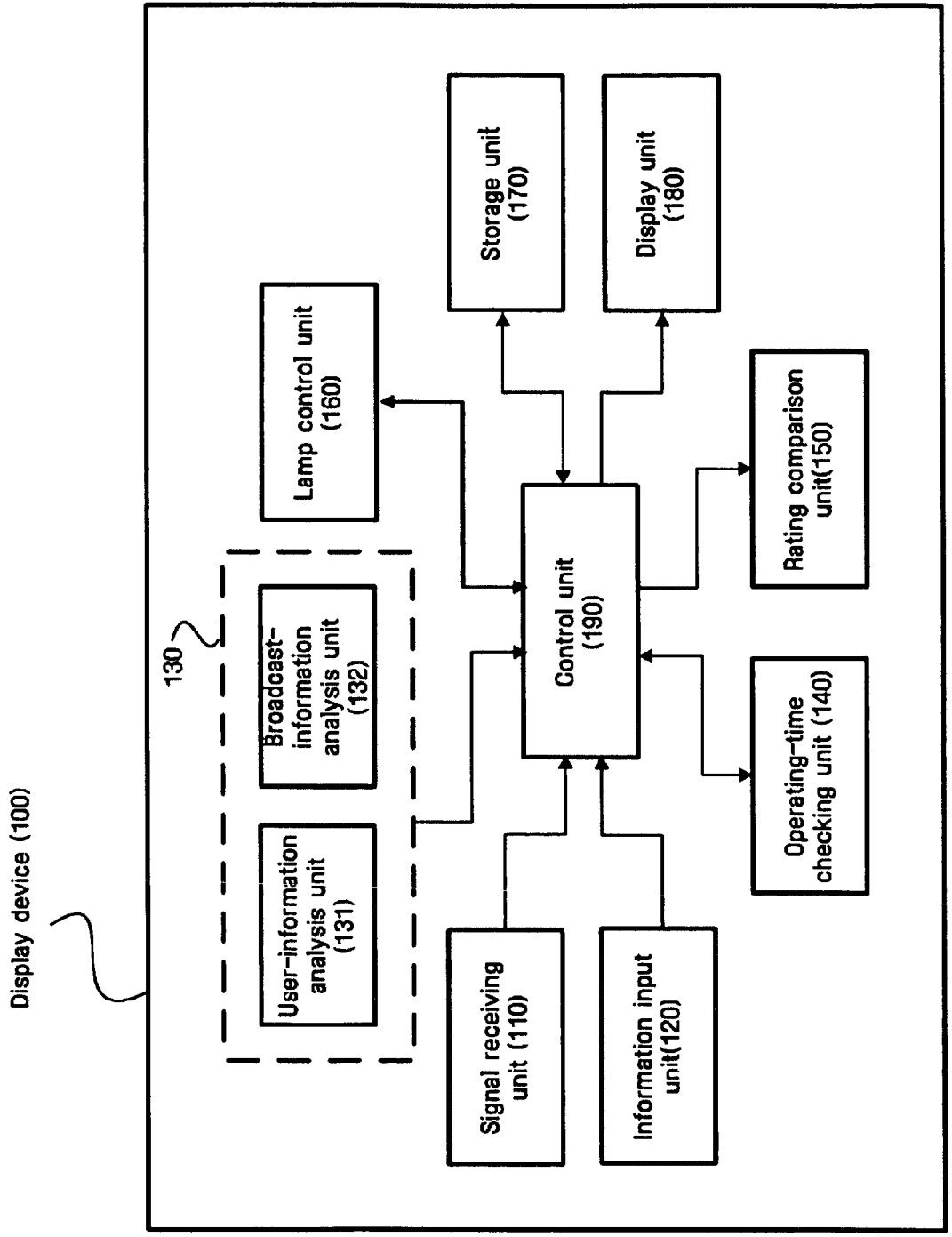
FIG. 1 is a block diagram illustrating the internal construction of a display apparatus that displays the viewing time and ratings of a program based on a viewer grade according to an exemplary embodiment of the present invention.

Advantages and features of the present invention and methods of accomplishing the same may by understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

The present invention will become more apparent by describing in detail exemplary embodiments thereof with reference to the figures presenting block diagrams or flow charts explaining a display method and apparatus for displaying TV ratings based on a viewer grade. It should be noted that the blocks and combinations of blocks of the flow charts can be achieved by computer program instructions. These computer program instructions are loaded into a general purpose computer, specific computer or other processors of data processing apparatuses, which means these instructions can produce ways of performing the functions illustrated in the blocks of the flow charts through computers or other processors of data processing apparatuses. These computer program instructions can also be stored in a computer or a computer-usable or computer-readable memory in order to implement the functions. These instructions can produce systems implementing methods for carrying out the functions shown in the blocks of the flow charts. Also, the computer program instructions can be loaded into a computer or other programmable data processing apparatus. Therefore, it is possible for such instructions to provide steps for performing the functions illustrated in the blocks of the flow charts by generating processes that are carried out by a computer.

Each block might represent parts of a module, or segments of code containing one or more instructions for performing specific logical functions. It should be noted that the functions illustrated in the blocks can be performed in a different order according to alternative examples. For example, the functions in the consecutive blocks can be performed at the same time or in reverse order.

While the following exemplary embodiments of the present invention disclose the invention as it relates to a television and TV programming, one of ordinary skill in the art will understand that the invention may be used in any circumstance in which a user views material.

FIG. 1 is a block diagram illustrating the internal construction of a display apparatus that displays the viewing time and ratings of a program based on a viewer grade according to an exemplary embodiment of the present invention. Here, the display apparatus 100 may be a digital television (DTV), a desktop computer or a notebook computer, which can provide the content of a predetermined moving picture. The present invention will be described using a DTV as an example.

The present invention is directed to providing information on the ratings and viewing time of a TV program that the child has watched to his/her parents through the display apparatus 100. However, the present invention is not limited to this.

As illustrated in FIG. 1, the display apparatus 100 includes a signal-receiving unit 110, an information-input unit 120, an information-analysis unit 130, an operating-time-checking unit 140, a ratings-comparison unit 150, a lamp-control unit 160, a storage unit 170, a display unit 180, and a control unit 190.

The term "unit" used in exemplary embodiments of the present invention means a software component or hardware component such as an ASIC (Application-Specific Integrated Circuit) and an FPGA (Field Programmable Gate-Array), which performs a certain role. A "unit" can also be an addressable storage medium. Thus, "unit" covers a wide range of components such as software components, object-oriented software components, class components and task components, processes, functions, attributes, procedures, subroutines, segments of program code, drivers, firmware, microcode, circuits, data, database, data structures, tables, arrays, and variables. The functions provided by such components and "units" can be combined by combined components or units, or divided into sub-components or units. Moreover, components and units can be designed to implement one or more CPUs in a device or secure multimedia card.

The signal-receiving unit 110 receives signals broadcasted by a broadcasting station.

The information-input unit 120 receives user information input by a user of the display apparatus 110. The user information includes the age of a user, the genre and viewing time of a TV program, and others. When the user is a child, his/her parents can input the user information on his/her behalf.

The information-analysis unit 130 analyzes ratings of the TV programs broadcasted by a station, and the user's viewer grade. The information analysis unit 130 includes a user information-analysis unit 131 that analyzes the viewer grade based on the user information, and a broadcast-information-analysis unit 132 that analyzes the TV program ratings by extracting the program information from the broadcast signals.

The operating-time checking unit 140 checks the operating time of the display apparatus 100. For example, when a user turns on the display apparatus 100, the operating-time checking unit 140 activates a timer to check and record the turn-on time and the operating time of the display apparatus 100 at regular intervals.

The ratings-comparison unit 150 compares the user's viewer grade with the TV ratings analyzed by the information-analysis unit 130. For example, the received TV ratings are compared with the analyzed viewer grade to thereby determine whether the program ratings are higher or lower than the user's viewer grade.

The lamp-control unit 160 regulates the color and the brightness of the lamps according to the result of the comparison and the information on the operating time of the display apparatus 100 provided by the operating-time checking unit 140.

For example, when the user's viewer grade is higher than the ratings of the TV program, the lamp control unit 160 lights blue lamps.

When the display apparatus 100 has been operated for less than two hours, the lamp control unit 160 performs a first-stage lighting (low degree of brightness). At tnis time, the color of the lamps to be lit is determined by the result of the comparison performed by the ratings-comparison unit 150. As an example, the lamps may be set to blue or red; but this is merely exemplary. The lamps can be a wide variety of colors. The colors of lamps will be described in more detail with reference to FIG. 2.

The storage unit 170 stores user information and program information analyzed by the information-analysis unit 130 as well as the watching history of a viewer of the display apparatus 100. The storage unit 170 also stores color information of the lamps according to the viewer grade, TV ratings and the operating time of the display apparatus 100. The color information of the lamps is stored in the storage unit 170 for a certain period of time, and is not lost when the display apparatus 100 is turned off.

For example, even if a child watched a specific program via the display apparatus 100 and turned off the display apparatus 100, his/her parents can check information on the program that the child watched, which was stored in the display apparatus 100. The tables stored in the storage unit 170 illustrated in FIG. 2 will be described in detail in the following.

The display unit 180 displays a broadcast program according to broadcasting signals received by the signal-receiving unit 110 and also displays the user's viewing information, which is stored in the storage unit 170 at the user's request (the user refers to parents of the child who watched the display apparatus 100). The viewing information of the display apparatus 100 includes detailed program information and the operating time of the display apparatus 100.

When broadcasting signals are received by the signal receiving unit 110, the control unit 190 manages processes in such a manner that the signal receiving unit 110 transmits the received signals to the broadcast-information analysis unit 132, the broadcast-information analysis unit 132 analyzes the program information of the received broadcasting signals and extracts ratings of the program, and the information-input unit transmits the user information input therethrough to the user-information analysis unit 131 in order to analyze and extract the user's viewer grade.

The control unit 190 also controls processes in such a way that the operating-time checking unit 140 checks the operating time of the display apparatus 100, and transmits the actual operating time to the lamp-control unit 160 to thereby allow the lamp control unit 160 to regulate the brightness of the lamps.

The control unit 190 sends the ratings-comparison unit 150 the user's viewer grade and the TV ratings analyzed by the user-information analysis unit 131 and the broadcast information analysis unit 132 respectively, and the ratings comparison unit 150 compares the user's viewer grade with the TV ratings to determine whether the user's viewer grade is higher or lower than the TV ratings.

The control unit 190 also sends the result of the comparison made by the ratings-comparison unit 150 to the lamp control unit 160 in order to determine the colors of the lamps.

The control unit 190 controls the display unit 180 so that the viewing history of the user of the display apparatus 100 can be displayed at his/her parents' request.

FIGS. 2A and 2B are a set of tables showing information on TV ratings and brightness of lamps according to the viewing time stored in the storage unit of the display apparatus, which displays the viewing time and the TV ratings based on the viewer grade, according to an exemplary embodiment of the present invention.

FIG. 2A illustrates a table matching color information of lamps with a user's age (viewer grade) and TV ratings. In FIG. 2A, the rows of the table indicate viewer grades 12 and the columns indicate TV ratings 11.

As illustrated, if the TV ratings are the same as or lower than the viewer grade (user's age) 12, blue lamps are lit. If the TV ratings are higher than the viewer grade, the red lamps are lit. However, the red lamps are not always lit when the TV ratings are higher than the user's viewer grade. The percentage of blue or red lamps to be lit may be different according to the gap between the TV ratings and the user's viewer grade. Blue and red lamps are an exemplary embodiment of the present invention, as the lamps are not limited to these colours; various colored lamps can be used.

For example, if the TV ratings indicate that the program is considered to be suitable for the age of 3 and above, and the viewer grade (which corresponds to the viewer's age) is 6, blue lamps are lit. If the TV ratings indicate that the program is considered to be suitable for the age of 19 and above, and the viewer grade is 14, the red lamps are lit.

If TV ratings indicate that the program is considered to be suitable for the age of 15 and above, and the viewer grade is 13, the blue and the red lamps are lit in an alternating manner. Alternating blue and red lamps implies that the gap between the TV ratings and the viewer grade is small.

In the present exemplary embodiment of the invention, the TV ratings are divided into 4 ratings, and viewer grades are divided into 5 grades according to an exemplary embodiment of the present invention, but this is only exemplary. The TV ratings and viewer grades can be divided according to the user's setting or another technique.

FIG. 2B is a diagram illustrating tables showing the brightness of the lamps according to the operating time of the display apparatus.

As illustrated, if the operating time 21 of the display apparatus 100 is less than 4 hours, the brightness 22 of the lamp is classified into a first stage (low brightness). If the operating time 21 of the display apparatus 100 is less than 8 hours, the brightness 22 is classified into a second stage (moderate brightness). And if the operating time 21 of the display apparatus 100 is more than 8 hours, the brightness 22 is classified into a third stage (maximum brightness).

For example, if the blue lamps are lit and the operating time of the display apparatus 100 is less than 2 hours, the brightness 22 is adjusted to the first stage (low brightness), implying that the blue lamps are lit.

FIGS. 3A to 3E are a set of diagrams illustrating different arrangements of the lamps of a display apparatus that displays viewing time and TV ratings based on the viewer grade according to an exemplary embodiment of the present invention. Herein, the lamps are either red or blue, but other colors may also be used. A single colored lamp is used in an exemplary embodiment of the present invention, but it is also possible for a lamp to emit different colors. In the drawings, blue lamps are indicated by solid lines, while red lamps are indicated by dotted lines. When the lamps are lit, the blue lamps are indicated by oblique lines, and the red lamps are indicated by dots.

Lamps 30 are provided in the external case of the display apparatus 100 according to an exemplary embodiment of the present invention, but the lamps may be located anywhere on the display apparatus 100.

Figure 3A:
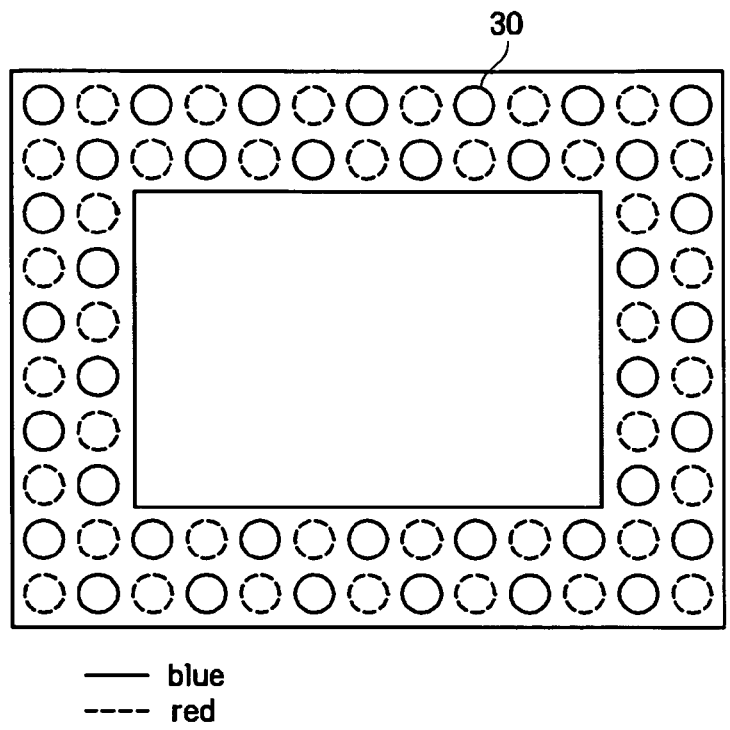
FIGS. 3A to 3E are a set of diagrams illustrating arrangements of lamps of the display apparatus according to an exemplary embodiment of the present invention.

As illustrated in FIG. 3A, the display apparatus 100 is equipped with blue and red lamps (30), which are alternately arranged. Here, blue lamps may be arranged in rows, and red lamps may be arranged in columns, and vice versa, or blue lamps may be located on the left side of the display apparatus (100) and red lamps may be located on the right side of the device.

Figure 3B:
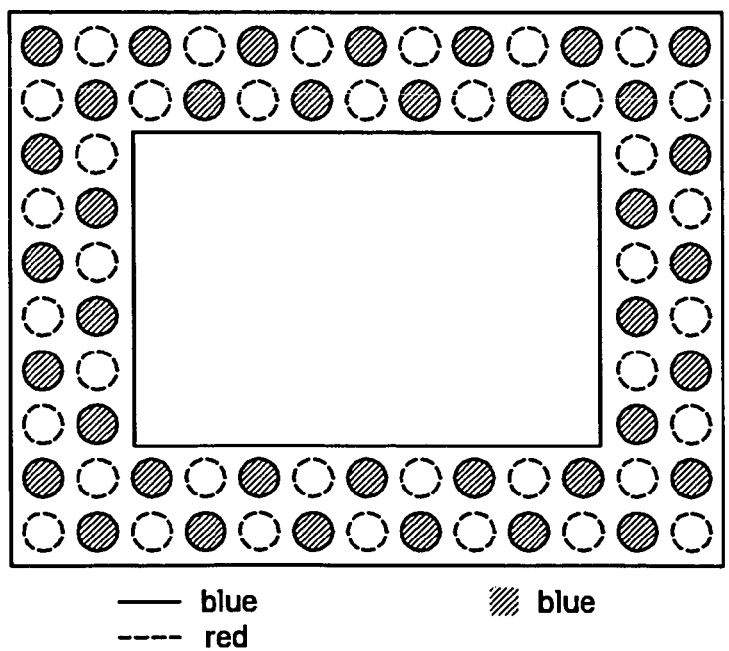
Figure 3C:
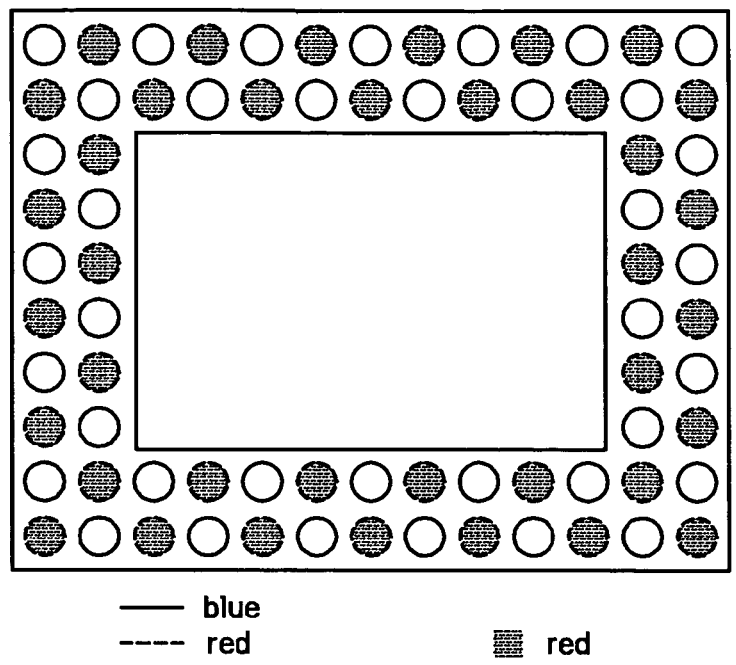

FIG. 3B illustrates an example of lighting blue lamps when the TV ratings are lower than the viewer grade, and FIG. 3C illustrates an example of lighting red lamps when the TV ratings are higher than the viewer grade.

Figure 3D:
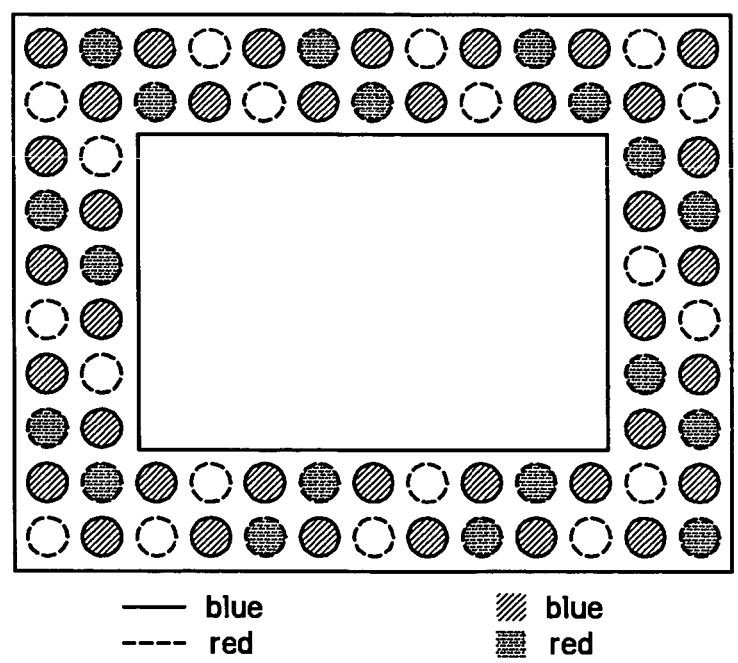
Figure 3E:
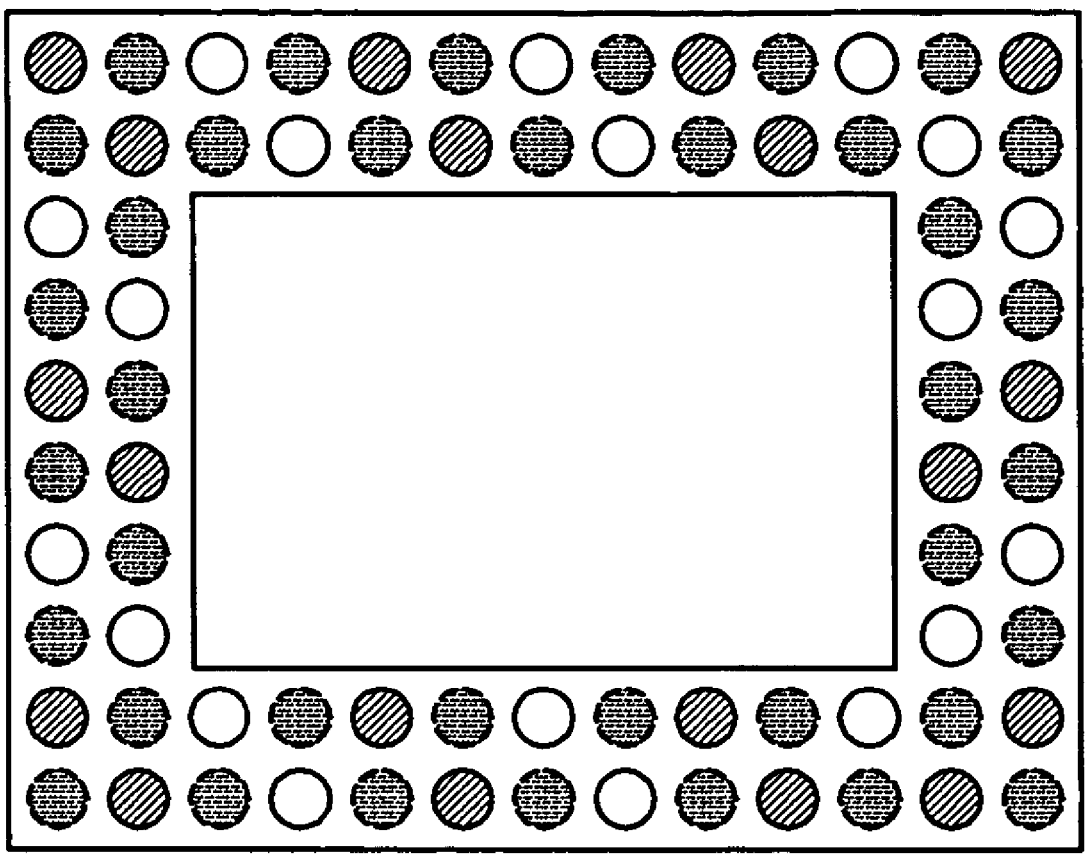

FIG. 3D illustrates an example of lighting more blue lamps than red lamps, and FIG. 3E illustrates an example of lighting more red lamps than blue lamps.

For example, if the user is 10 years old and the TV ratings are 12, more blue lamps are lit than red lamps because the TV ratings are higher than the viewer grade but the gap between the TV ratings and the viewer grade is small (corresponding to a 1-grade difference based on the age of a user).

If the user is 10 years old and the TV ratings are 15, more red lamps are lit than blue lamps because the gap between the TV ratings and the viewer grade is large (corresponding to a 2-grade difference).

FIG. 4 is a diagram illustrating the colors of lamps lit based on the TV ratings and the operating time of a display apparatus, according to an exemplary embodiment of the present invention. Here, blue lamps are indicated by oblique lines, and red lamps are indicated by dots.

As illustrated, the lamps provided in the display apparatus 100, whose colors are different, are lit based on the gap between the TV ratings and the viewer grade. That is, when the TV ratings are the same or lower than the viewer grade, blue lamps are lit. When the TV ratings are very different from the viewer grade (i.e., beyond the suitable grade), more red lamps than blue lamps begin are lit, and finally only red lamps are lit.

That is, the farther the TV ratings are from the viewer grade, the greater the number of red lamps that are on, and the greater the number of blue lamps that are off.

The brightness of the lamps 30 depends on the operating time of the display apparatus 100. The operating time of the display apparatus 100 means the viewing time of a user.

The longer the viewer uses the display apparatus 100 (that is, the longer the viewer watches the display apparatus), the brighter the lamps 30 become (for example, up to 100% brightness), and the shorter the viewer uses the display apparatus 100 (that is, the shorter the viewer watches the display apparatus), the darker the lamps 30 become (for example, down to 10% brightness).

For example, if the blue lamps are lit and a viewer has been using the display apparatus for over 8 hours, the blue lamps on the display device become the brightest they can be.

Thus, even if a child watched the display apparatus while his/her parents were out, the parents can later check which programs and how long their child watched the programs based on the brightness of the lamps equipped in the external case of the display apparatus.

Figure 5:
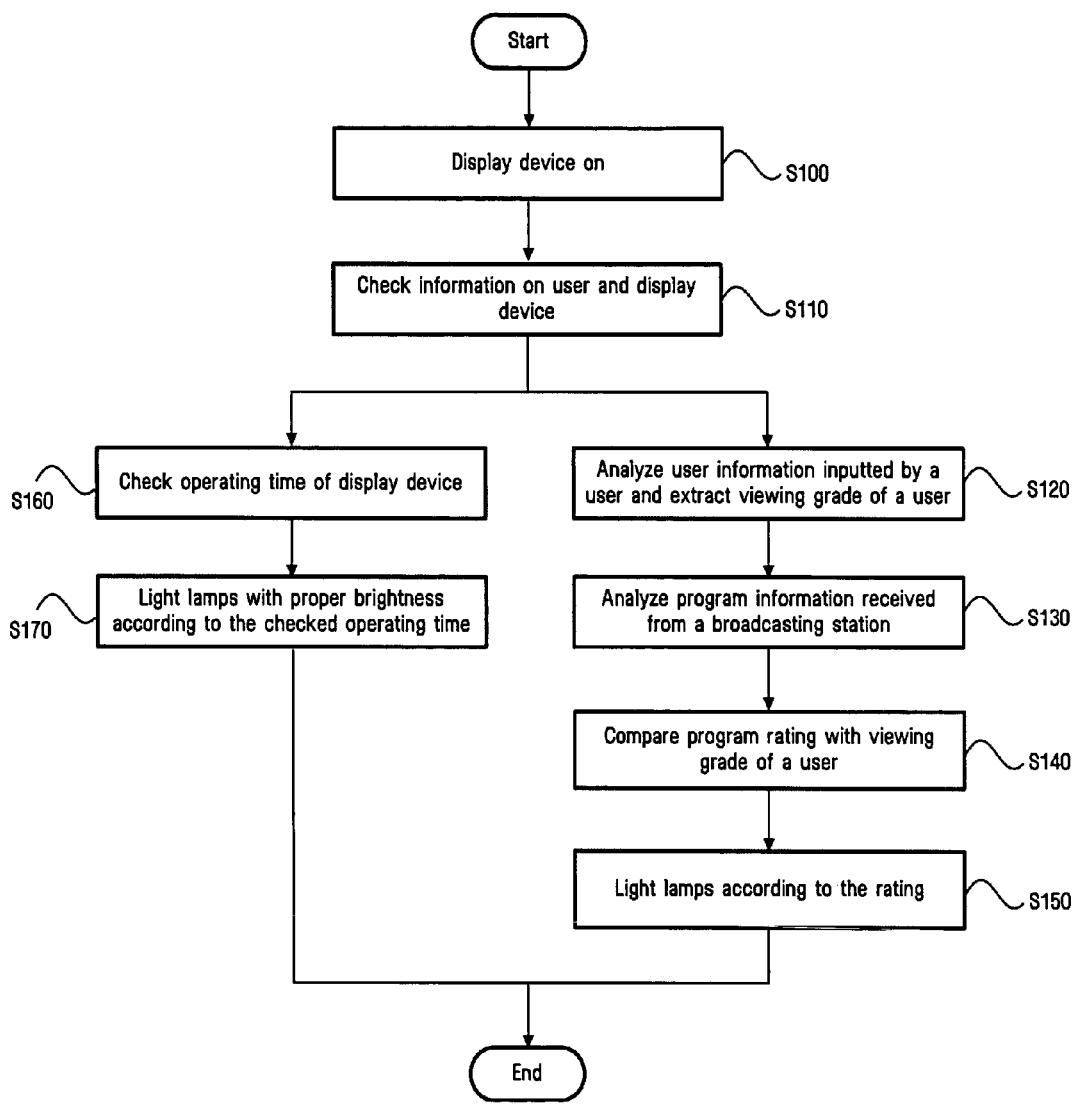
FIG. 5 is a flowchart illustrating a method for displaying the viewing time and TV ratings based on a viewer grade according to another exemplary embodiment of the present invention.

FIG. 5 is a flow chart illustrating a method of displaying the viewing time and TV ratings based on a viewer grade according to an exemplary embodiment of the present invention.

When the display apparatus 100 is turned on S100, the control unit 190 operates and controls each unit built therein to check information on a viewer and operation of the display apparatus S110.

First, the information input unit 120 receives user information input by a user. Then, the control unit 190 transmits the input user information to the user-information analysis unit 131. The user-information analysis unit 131 analyzes the received user information to extract a viewer grade (that is, the user's age) S120.

The signal receiving unit 110 receives signals broadcasted by a broadcasting station, and the control unit 190 transmits the broadcasted signals to the broadcast-information-analysis unit 132. The broadcast-information-analysis unit 132 extracts information on a TV program from the broadcasted signals to determine the ratings of the program S130.

Then, the control unit 190 transmits both the viewer grade analyzed by the user-information-analysis unit 131 and the TV ratings analyzed by the broadcast-information-analysis unit 131 to the ratings comparison unit 150, and then the ratings comparison unit 150 compares the viewer grade with the TV ratings S140.

Finally, the ratings-comparison unit 150 transmits the comparison result to the control unit 190, and then the control unit 190 transmits the result to the lamp-control unit 160. The lamp-control unit 160 lights lamps corresponding to the transmitted result S150.

Figure 6:
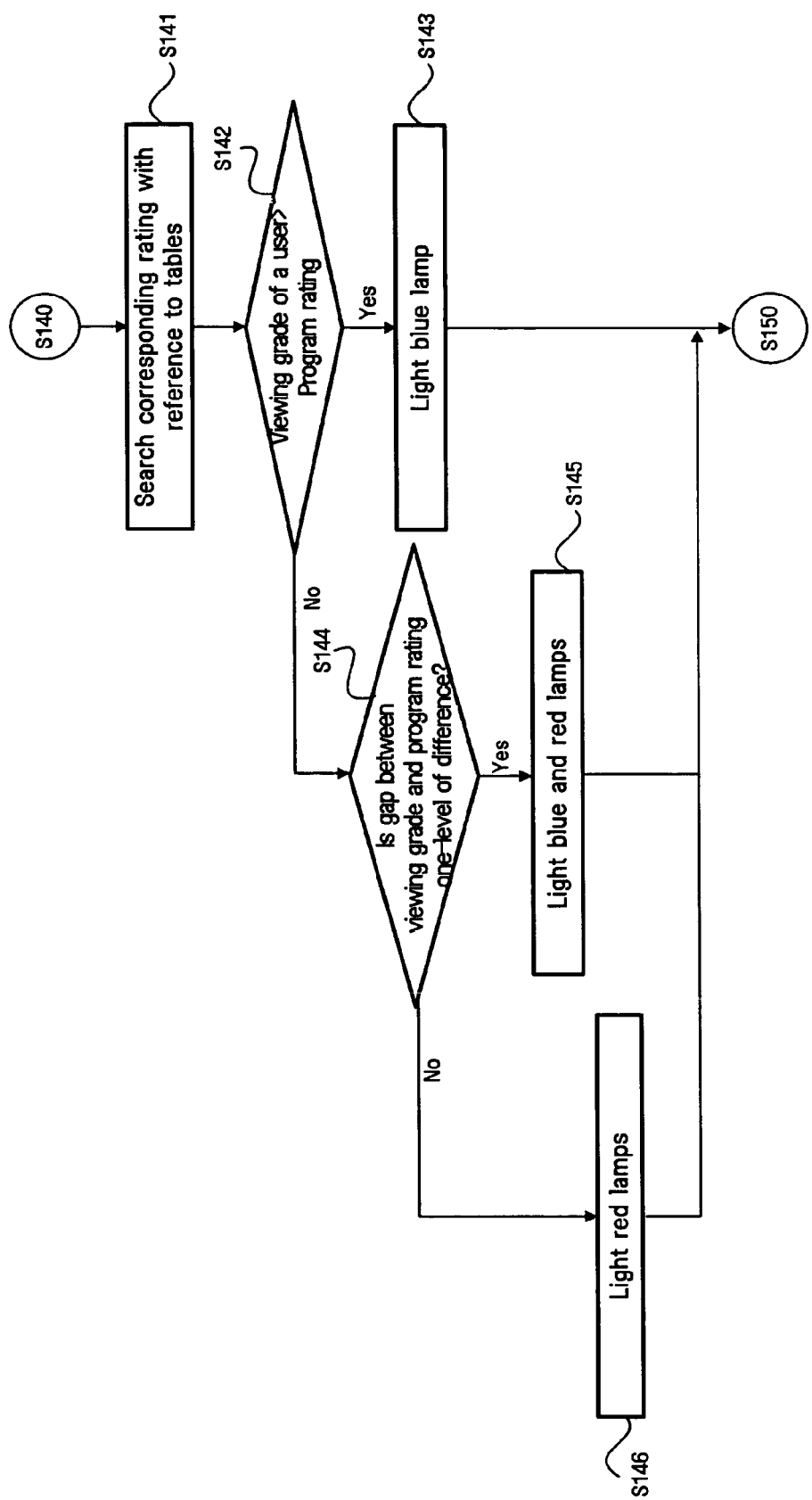
FIG. 6 is a flowchart illustrating the process of determining which lamps are to be lit based on TV ratings and a viewer grade according to another exemplary embodiment of the present invention.

The comparison of the viewer grade with the program ratings is detailed in FIG. 6. The ratings comparison unit 150 searches for the TV ratings according to the user's age with reference to the table, which matches color information of lamps to be lit according to the user's age and the TV ratings that are stored in the storage unit 170 S141.

Then, the ratings comparison unit 150 compares the TV ratings with the viewer grade. If the viewer grade is higher than the TV ratings S142, the lamp control unit 160 turns on the blue lamps S143.

And, if the viewer grade is lower than the TV ratings S142, the ratings comparison unit 150 calculates the gap between the viewer grade and the TV ratings.

When the gap between the viewer grade and the TV ratings is one grade (or 2 or 3), the lamp-control unit 160 lights blue and red lamps together S144 and S145. When the gap between the viewer grade and the TV ratings is greater than one grade, the lamp control unit 160 lights red lamps S146. The ratio of blue to red lamps may vary when blue lamps and red lamps are lit together.

The control unit 190 informs the operating time checking unit 140 that the display apparatus 100 is operating as soon as the display apparatus 100 starts operating, and then the operating-time-checking unit 140 operates a timer to record the operating time of the display apparatus 100, and continuously checks the operation at regular intervals S160.

The control unit 190 transmits the checked operating time to the lamp-control unit 160, and the lamp control unit 160 determines the brightness of lamps based on the operating time of the display apparatus 100, which is provided by the control unit S170.

Figure 7:
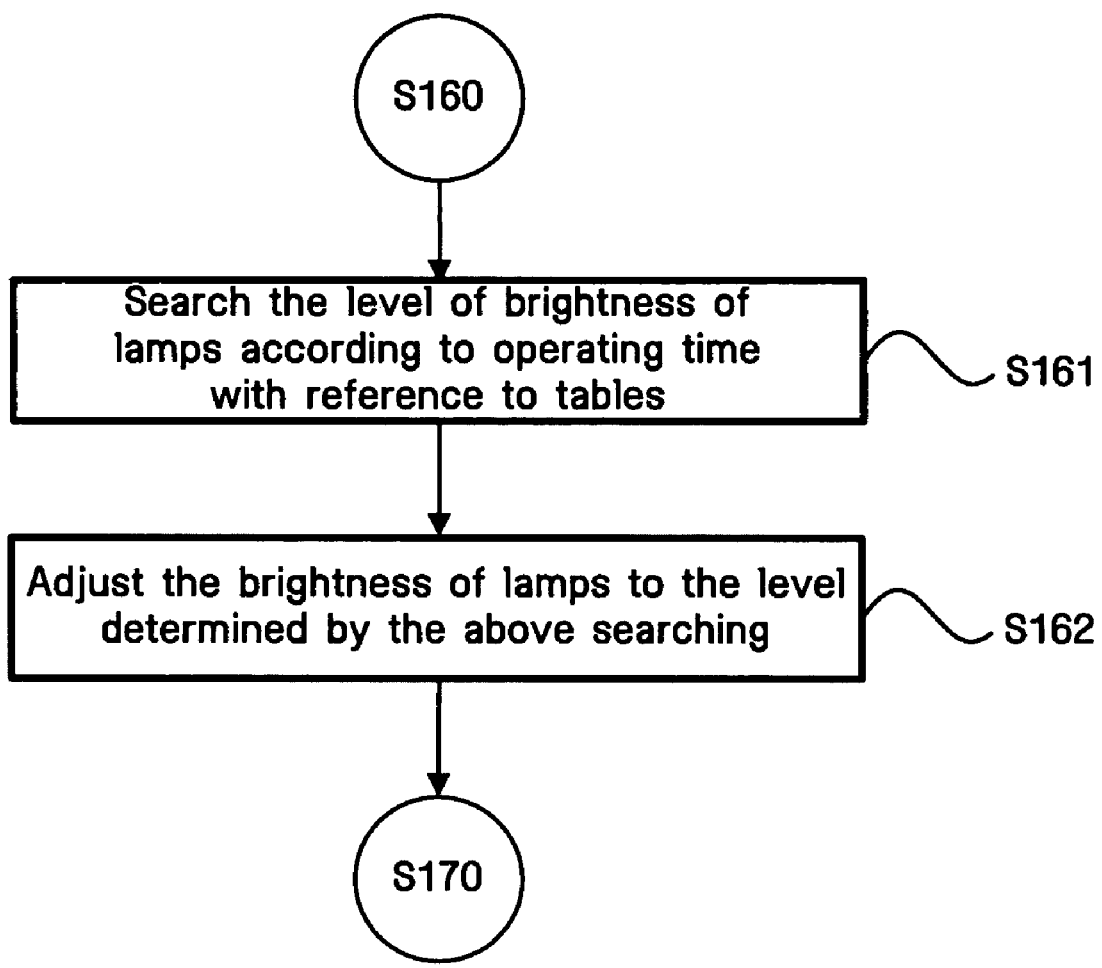
FIG. 7 is a flowchart illustrating the process of determining the brightness of the lamps that are to be lit based on the operating time of the display apparatus according to an exemplary embodiment of the present invention.

The process of controlling the brightness based on the operating time of the display apparatus 100 will be described in more detail with reference to FIG. 7. As illustrated, the ratings-comparison unit 150 detects the brightness of the lamps, which is matched with the operating time checked by the operating-time-checking unit 140, by referring to the table that stores information on the lamp brightnesses linked to the operating time of the display apparatus stored in the storage unit 170 S161.

Then, the ratings-comparison unit 150 transmits information on the brightness of the lamps matched with the checked operating time to the lamp-control unit 160. The lamp control unit 160 adjusts the brightness of lamps according to the operating time of the display apparatus 100 based on the brightness information of the lamps S163.

Therefore, according to the colors of the lamps, which are determined based on the ratings of the TV program watched by a user and the time the display apparatus that was operated by the user, his/her parents are able to know which TV program and how long their child watched the display apparatus.

Referring to the color of lamps provided in the external case of the display apparatus 100, a child can also understand the ratings of the program that he/she is now watching, and the operating time of the display apparatus, whereby the child can regulate the TV viewing time voluntarily and/or try to select a program suitable for his/her age.

An exemplary embodiment of the present invention will be described in the following. It is assumed that a user who wants to watch a TV program is 12 years old, that user information is stored in the TV, and that the user will watch the TV program for 3 hours.

When a user turns on the TV, the operating-time-checking unit 140 checks and records the time when the TV starts operating.

Program information is extracted from the signals broadcasted by a broadcasting station, with which the TV ratings thereof are analyzed. The analyzed TV ratings show that the program is suitable for the age of 19 and above.

The ratings-comparison unit 150 compares the set viewer grade (the age of 12) with the analyzed TV ratings, under which the age of 19 and above can watch the program, whereby it is judged that the broadcasted program is outside the grade range permitted to the user.

Then, the lamp control unit 160 lights red lamps, and adjusts the red lamps to the moderate degree of brightness according to the hours of TV watched (three hours).

Therefore, the parents can know the ratings of the TV programs watched by their child and the TV viewing time at a glance.

As described above, a method of and an apparatus for displaying TV ratings based on a viewer grade may have at least one of the following effects.

The ratings of a TV program that a viewer watched and the operating time of the display apparatus (that is, a TV set) are indicated by colors of lamps equipped in the external case of the TV. Thus, the viewer's parents can find out which TV program and how long their child watched alone.

In addition, since the colors of lamps according to the ratings of the TV program watched by the user and those according to the length of time the user watched TV are indicated through the lamps of the external case of the display apparatus 100, the child can regulate his/her TV watching time voluntarily and/or select a program suitable for his/her age.

Further, since information is visualized through the lamps, it is easy for the viewer to obtain information on a user's viewing, and therefore it is an efficient user interface.

It will be understood by those of ordinary skill in the art that various replacements, modifications and changes in form and details may be made therein without departing from the spirit and scope of the present invention as defined by the following claims. Therefore, it is to be appreciated that the above described embodiments are for purposes of illustration only and not to be construed as limitations of the invention.

What is claimed is:

1. A display apparatus for displaying a viewing time and ratings of viewed material based on a viewer grade, the apparatus comprising:

an information analysis unit which analyzes the viewer grade based on user information, and ratings of viewed material;

a ratings comparison unit which compares the viewer grade with the ratings of viewed material;

an operating time checking unit which checks and records an operating time of the display apparatus; and a light-control unit which lights a plurality of lights provided in an external case of the display apparatus according to the comparison result, and adjusts a brightness of the plurality of lights according to the operating time of the display apparatus;

wherein the light-control unit increases the brightness of the plurality of lights as the operating time increases, wherein the plurality of lights light in different colors and the percentage of the different colors to be lit is determined according to the comparison between the viewer grade and the ratings of viewed material.

2. The display apparatus of claim 1, further comprising:

a storage unit which stores the user information, program information and viewing history of the user of the display apparatus.

3. The display apparatus of claim 1, wherein the user information is input by a user of the display apparatus.

4. The display apparatus of claim 1, wherein the ratings of viewed material are analyzed by extracting program information from signals broadcasted by a broadcasting station.

5. A method of displaying viewing time and ratings of viewed material based on a viewer grade, the method comprising:

inputting user information of a user using a display apparatus;

analyzing the viewer grade based on the input user information, and the ratings of viewed material;

comparing the analyzed viewer grade and the ratings of viewed material;

checking and recording an operating time of the display apparatus; and lighting a plurality of lights provided in the external case of the display apparatus according to the comparison result, and adjusting a brightness of the plurality of lights according to the operating time of the display apparatus;

wherein the adjusting the brightness comprises increasing the brightness of the plurality of lights as the operating time increases, wherein the plurality of lights light in different colors and the percentage of the different colors to be lit is determined according to the result of the comparing operation between the viewer grade and the ratings of viewed material.

6. The method of claim 5, wherein a viewing history of a user of the display apparatus is stored and is provided at the user's request.

7. The method of claim 5, wherein the analyzing of the ratings of viewed material is performed by extracting program information from signals broadcasted by a broadcasting station.

* * * * *